(12) United States Patent
Bailey

(10) Patent No.: US 9,177,603 B2
(45) Date of Patent: Nov. 3, 2015

(54) METHOD OF ASSEMBLING AN ENHANCED MEDIA CONTENT NARRATIVE

(75) Inventor: Christopher A. Bailey, Ojai, CA (US)

(73) Assignee: Intension, Inc., Ojai, CA (US)

( * ) Notice: Subject to any disclaimer, the term of this patent is extended or adjusted under 35 U.S.C. 154(b) by 1180 days.

(21) Appl. No.: 12/574,158

(22) Filed: Oct. 6, 2009

(65) Prior Publication Data

US 2010/0077285 A1 Mar. 25, 2010

Related U.S. Application Data

(63) Continuation-in-part of application No. 11/687,721, filed on Mar. 19, 2007, now Pat. No. 7,669,128.

(60) Provisional application No. 61/103,231, filed on Oct. 6, 2008.

(51) Int. Cl.

| | |
|---|---|
| *G06F 3/00* | (2006.01) |
| *G11B 27/034* | (2006.01) |
| *G11B 27/10* | (2006.01) |
| *G11B 27/32* | (2006.01) |
| *H04N 5/445* | (2011.01) |
| *H04N 21/482* | (2011.01) |
| *H04N 21/81* | (2011.01) |
| *G06F 3/0482* | (2013.01) |
| *G06F 3/0481* | (2013.01) |

(Continued)

(52) U.S. Cl.
CPC ............ *G11B 27/034* (2013.01); *G11B 27/105* (2013.01); *G11B 27/322* (2013.01); *H04N 5/44543* (2013.01); *H04N 5/44591* (2013.01); *H04N 21/4821* (2013.01); *H04N 21/4825* (2013.01); *H04N 21/812* (2013.01); *G06F 3/0481* (2013.01); *G06F 3/0482* (2013.01); *G06F 3/0484* (2013.01); *G06F 3/04842* (2013.01); *G11B 2220/2562* (2013.01); *H04L 65/403* (2013.01)

(58) Field of Classification Search
CPC .. G11B 27/034; G11B 27/105; G11B 27/322; G11B 2220/2562; H04N 5/44543; H04N 5/44591; H04N 21/4821; H04N 21/4825; H04N 21/821; G06F 3/04842; G06F 3/0482; G06F 3/0484; G06F 3/0481; H04L 65/403
USPC .......................................................... 715/719
See application file for complete search history.

(56) References Cited

U.S. PATENT DOCUMENTS

| | | | |
|---|---|---|---|
| 5,101,364 A | 3/1992 | Davenport et al. | ........... 715/723 |
| 5,237,648 A | 8/1993 | Mills et al. | ............. 715/723 |
| 5,442,744 A | 8/1995 | Piech et al. | ................... 715/251 |

(Continued)

OTHER PUBLICATIONS

PCT International Search Report, Feb. 5, 2008.

(Continued)

*Primary Examiner* — Tuyetlien Tran
(74) *Attorney, Agent, or Firm* — Matthew J. Lattig; Charter IP, LLC

(57) ABSTRACT

In a method of assembling an enhanced media content narrative, a navigation grid is initially defined by program name, chapter name and sub-chapter names. The grid is populated with program element file names, and the content is associated with the element file names in each chapter/sub-chapter. An automated toolbar is created for the grid matrix and combined with introductory content to provide an enhanced media content narrative for playback by a viewer.

15 Claims, 9 Drawing Sheets

| COMMAND | RESPONSE |
|---|---|
| "Insert Chapter Names" | 1 Live Program |
| | 2 Tiger Woods |
| | 3 Phil Mickelson |
| | 4 VJ Singh |

(51) Int. Cl.
  *H04L 29/06* (2006.01)
  *G06F 3/0484* (2013.01)

(56) References Cited

U.S. PATENT DOCUMENTS

| | | | | |
|---|---|---|---|---|
| 5,517,605 | A | 5/1996 | Wolf | 707/104.1 |
| 5,589,945 | A | 12/1996 | Abecassis | 386/83 |
| 5,598,276 | A | 1/1997 | Cookson et al. | 386/46 |
| 5,745,710 | A | 4/1998 | Clanton et al. | 725/60 |
| 5,778,135 | A | 7/1998 | Ottesen et al. | 386/52 |
| 5,861,881 | A | 1/1999 | Freeman et al. | 715/201 |
| 5,956,453 | A | 9/1999 | Yaegashi et al. | 386/52 |
| 6,061,758 | A | 5/2000 | Reber et al. | 711/100 |
| 6,135,881 | A * | 10/2000 | Abbott et al. | 463/3 |
| 6,166,735 | A | 12/2000 | Dom et al. | 715/749 |
| 6,229,524 | B1 | 5/2001 | Chernock et al. | 345/157 |
| 6,243,085 | B1 | 6/2001 | Roach | 345/302 |
| 6,249,281 | B1 | 6/2001 | Chen et al. | 715/753 |
| 6,262,724 | B1 | 7/2001 | Crow et al. | 715/723 |
| 6,351,596 | B1 | 2/2002 | Ostrover | 386/46 |
| 6,378,130 | B1 | 4/2002 | Adams | 725/95 |
| 6,385,388 | B1 | 5/2002 | Lewis et al. | 386/94 |
| 6,392,664 | B1 | 5/2002 | White et al. | 345/717 |
| 6,463,207 | B1 | 10/2002 | Abecassis | 386/70 |
| 6,564,225 | B1 | 5/2003 | Brogliatti et al. | 707/104.1 |
| 6,628,302 | B2 | 9/2003 | White et al. | 345/717 |
| 6,628,303 | B1 | 9/2003 | Foreman et al. | 715/723 |
| 6,686,918 | B1 | 2/2004 | Cajolet et al. | 345/473 |
| 6,760,042 | B2 | 7/2004 | Zetts | 715/716 |
| 6,938,208 | B2 | 8/2005 | Reichardt | 715/719 |
| 6,941,574 | B1 | 9/2005 | Broadwin et al. | 725/37 |
| 6,971,119 | B1 | 11/2005 | Arsenault et al. | 725/89 |
| 6,976,229 | B1 | 12/2005 | Balabanovic et al. | 715/838 |
| 7,124,366 | B2 | 10/2006 | Foreman et al. | 715/719 |
| 7,231,607 | B2 | 6/2007 | Neely et al. | 715/747 |
| 7,248,778 | B1 | 7/2007 | Anderson et al. | 386/52 |
| 7,757,252 | B1 * | 7/2010 | Agasse | 725/41 |
| 2001/0037303 | A1 | 11/2001 | Mizrahi | 705/52 |
| 2002/0053083 | A1 | 5/2002 | Massey | 725/46 |
| 2002/0053089 | A1 | 5/2002 | Massey | 725/135 |
| 2002/0072966 | A1 | 6/2002 | Eldering et al. | 705/14 |
| 2002/0170061 | A1 | 11/2002 | DiLorenzo | 725/78 |
| 2003/0018972 | A1 | 1/2003 | Arora | 725/47 |
| 2003/0036899 | A1 | 2/2003 | Leslie et al. | 704/2 |
| 2003/0058866 | A1 | 3/2003 | Kitayama | 370/394 |
| 2003/0093790 | A1 | 5/2003 | Logan et al. | 725/38 |
| 2003/0190143 | A1 | 10/2003 | Girgensohn et al. | 386/55 |
| 2004/0027393 | A1 | 2/2004 | Kato et al. | 345/838 |
| 2004/0059996 | A1 | 3/2004 | Fasciano | 715/500.1 |
| 2004/0070595 | A1 | 4/2004 | Atlas et al. | 345/723 |
| 2004/0091848 | A1 | 5/2004 | Nemitz | 434/365 |
| 2004/0117831 | A1 * | 6/2004 | Ellis et al. | 725/53 |
| 2004/0139481 | A1 | 7/2004 | Atlas et al. | 725/135 |
| 2004/0194123 | A1 | 9/2004 | Fredlund et al. | 725/9 |
| 2004/0267816 | A1 | 12/2004 | Russek | 707/104.1 |
| 2005/0120389 | A1 | 6/2005 | Boss et al. | 725/135 |
| 2005/0163462 | A1 | 7/2005 | Pratt et al. | 386/4 |
| 2005/0198677 | A1 | 9/2005 | Lewis | 725/87 |
| 2005/0272013 | A1 | 12/2005 | Knight | 434/156 |
| 2006/0064644 | A1 | 3/2006 | Joo | 715/751 |
| 2006/0101338 | A1 | 5/2006 | Kates | 715/716 |
| 2006/0153542 | A1 | 7/2006 | Chun et al. | 386/125 |
| 2006/0200413 | A1 | 9/2006 | Kessel et al. | 705/50 |
| 2007/0099684 | A1 | 5/2007 | Butterworth | 463/1 |
| 2007/0162854 | A1 | 7/2007 | Kikinis | 715/719 |
| 2009/0274435 | A1 * | 11/2009 | Kobayashi et al. | 386/95 |

OTHER PUBLICATIONS

Edward Shen; Storied Navigation, MIT Media Lab; Jan. 1, 2006.
James Jung-Hoon Seo; Intercreative Cinema; MIT; Sep. 1, 2001.
Edward Shen; Storied Navigation; MIT Media Lab; Jan. 1, 2006.†
Tsunami; Silent Steel; 1997.†
Avid Technology, Inc.; Media Composer Adrenaline; Jan. 1, 2006.†
James Jung-Hoon Seo; Intercreative Cinema; MIT; Sep. 1, 2001.†

\* cited by examiner
† cited by third party

FIG. 2A

| COMMAND | RESPONSE |
|---|---|
| "Insert Chapter Names" | 1 Live Program |
| | 2 Tiger Woods |
| | 3 Phil Mickelson |
| | 4 VJ Singh |

FIG. 2B

| COMMAND | RESPONSE |
|---|---|
| "Insert Sub-Chapter Names" | 1 Hole #1 |
| | 2 Hole #2 |
| | 3 Hole #3 |
| | 4 Hole #4 |

FIG. 2C

| | Live Program | Tiger Woods | Phil Mickelson | VJ Singh |
|---|---|---|---|---|
| Hole #1 | | | | |
| Hole #2 | | | | |
| Hole #3 | | | | |
| Hole #4 | | | | |

FIG. 3

| COMMAND | RESPONSE | | | |
|---|---|---|---|---|
| "Insert media file ID/Name" | | | | |
| | Live Program | Tiger Woods | Phil Mickelson | VJ Singh |
| Hole #1 | Live Program #1 | Tiger Woods hole 1 | Phil Mickelson hole 1 | VJ Singh hole 1 |
| Hole #2 | Live Program #2 | Tiger Woods hole 2 | Phil Mickelson hole 2 | VJ Singh hole 2 |
| Hole #3 | Live Program #3 | Tiger Woods hole 3 | Phil Mickelson hole 3 | VJ Singh hole 3 |
| Hole #4 | Live Program #4 | Tiger Woods hole 4 | Phil Mickelson hole 4 | VJ Singh hole 4 |

FIG. 4

| COMMAND | RESPONSE | | | |
|---|---|---|---|---|
| "Insert media file ID/Name" | | | | |
| | Live Program | Tiger Woods | Phil Mickelson | VJ Singh |
| Hole #1 | Live Program #1 | Tiger Woods hole 1 | Phil Mickelson hole 1 | VJ Singh hole 1 |
| Hole #2 | Live Program #2 | Tiger Woods hole 2 | Phil Mickelson hole 2 | VJ Singh hole 2 |
| Hole #3 | Live Program #3 | Tiger Woods hole 3 | Phil Mickelson hole 3 | VJ Singh hole 3 |
| Hole #4 | Live Program #4 | Tiger Woods hole 4 | Phil Mickelson hole 4 | VJ Singh hole 4 |
| "Insert file description" | | | | |
| Tiger Woods hole 1 | "2008 US Open Tiger Woods hole 1 Tiger shoots a birdie." | | | |

FIG. 6

| COMMAND | RESPONSE | | | |
|---|---|---|---|---|
| "Select file" | | | | |
| | Live Program | Tiger Woods | Phil Mickelson | VJ Singh |
| Hole #1 | Live Program #1 | *Tiger Woods hole 1* | Phil Mickelson hole 1 | VJ Singh hole 1 |
| Hole #2 | Live Program #2 | Tiger Woods hole 2 | Phil Mickelson hole 2 | VJ Singh hole 2 |
| Hole #3 | Live Program #3 | Tiger Woods hole 3 | Phil Mickelson hole 3 | VJ Singh hole 3 |
| Hole #4 | Live Program #4 | Tiger Woods hole 4 | Phil Mickelson hole 4 | VJ Singh hole 4 |

| COMMAND | |
|---|---|
| "Select Identification Image" | *2008 US Open Tiger Woods hole1.jpg* |

FIG. 8

| COMMAND | RESPONSE | | | | |
|---|---|---|---|---|---|
| "Display toolbar" | | | | | |
| | | Live Program | Tiger Woods | Phil Mickelson | VJ Singh |
| | Hole #1 | *Live Program #1* | *Tiger Woods hole 1* | *Phil Mickelson hole 1* | *VJ Singh hole 1* |
| | Hole #2 | *Live Program #2* | *Tiger Woods hole 2* | *Phil Mickelson hole 2* | *VJ Singh hole 2* |
| | Hole #3 | *Live Program #3* | *Tiger Woods hole 3* | *Phil Mickelson hole 3* | *VJ Singh hole 3* |
| | Hole #4 | *Live Program #4* | *Tiger Woods hole 4* | *Phil Mickelson hole 4* | *VJ Singh hole 4* |

FIG. 9

| COMMAND | RESPONSE | | | |
|---|---|---|---|---|
| "Select element load screen" | | | | |
| | Live Program | Tiger Woods | Phil Mickelson | VJ Singh |
| Sponsorship load screen | Live Program LS 1 | *Tiger Woods LS 1* | Phil Mickelson LS 1 | VJ Singh LS 1 |
| Hole #1 | Live Program #1 | Tiger Woods hole 1 | Phil Mickelson hole 1 | VJ Singh hole 1 |
| Sponsorship load screen | Live Program LS 2 | Tiger Woods LS 2 | Phil Mickelson LS 2 | VJ Singh LS 2 |
| Hole #2 | Live Program #2 | Tiger Woods hole 2 | Phil Mickelson hole 2 | VJ Singh hole 2 |
| Sponsorship load screen | Live Program LS 3 | Tiger Woods LS 3 | Phil Mickelson LS 3 | VJ Singh LS 3 |
| Hole #3 | Live Program #3 | Tiger Woods hole 3 | Phil Mickelson hole 3 | VJ Singh hole 3 |
| Sponsorship load screen | Live Program LS 4 | Tiger Woods LS 4 | Phil Mickelson LS 4 | VJ Singh LS 4 |
| Hole #4 | Live Program #4 | Tiger Woods hole 4 | Phil Mickelson hole 4 | VJ Singh hole 4 |

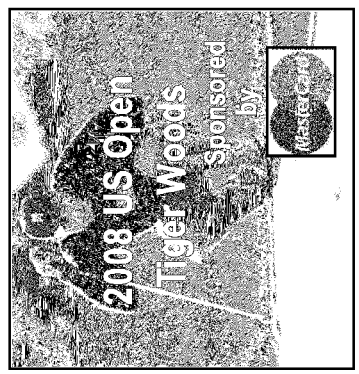

METHOD OF ASSEMBLING AN ENHANCED MEDIA CONTENT NARRATIVE

PRIORITY STATEMENT

The present application is a continuation-in-part of application Ser. No. 11/687,721 to Bailey et al., entitled "METHODS OF ENHANCING MEDIA CONTENT NARRATIVE", filed Mar. 19, 2007, now U.S. Pat. No. 7,669,128, the entire contents of which are hereby incorporated by reference herein. This application claims the benefit under 35 U.S.C. 119(e) of U.S. Provisional Application No. 61/103,231, filed Oct. 6, 2008, the entire contents of which are hereby incorporated by reference herein.

BACKGROUND

1. Field

Example embodiments relate in general to a method of assembling an enhanced media content narrative.

2. Related Art

In the inventor's co-pending '721 application, the example system and method formats content, such as for intra-program navigation, in a completely different way—a displayed row-by-column navigation grid matrix that has a formatted organization between chapters (forming columns) and sub-chapters (forming rows and related to or tied to the columns). The chapter/sub-chapter organization of the navigation grid facilitates a user's ability to select their own navigation path through many selectable alternative scenes (that are not fixed or tied to a particular decision). The user selections can be stored in a desired sequence as a digital file, to be played back as a modified version of the video program being viewed.

DVR technologies such as TiVo® permit viewers to move back and forth along a linear collection of scenes. The example navigation grid allows viewers to move between the scenes, behind the scenes, and beyond the scenes. The example methodology described in the '721 application gives producers the ability to use all the content, and provide audiences with richer, niche entertainment.

After a program is edited into shorter subject-specific clips, clips can be identified and arranged in the navigation grid in the aforementioned chapter and sub-chapter format. In an example, chapters can be specific storylines, event, or characters. In an example, sub-chapters can establish time progression and evolution. Each row of the grid represents a sub-chapter of selectable elements that are common to all columns, and each column represents a chapter having designated sub-chapters therein that are tied to the respective chapter.

SUMMARY

An example embodiment of the present invention is directed to a method of assembling an enhanced media content narrative of a program. In the method, a program name, number of chapters and sub-chapters, and chapter and sub-chapter names for media content are inserted so as to form headers of empty cells for a row by column navigation grid matrix. The cells of the grid are populated with program element file names, and a program element is associated with each program element file name in each sub-chapter. The grid matrix is formatted so that each row is a sub-chapter with selectable program elements common to all columns and each column is a chapter having sub-chapters that are related thereto.

Another example embodiment is directed to a method of assembling an enhanced media content narrative of a program to be played back on a video display. The method includes configuring an empty row by column grid matrix to be populated with program elements of a media program by inputting the program name, numbers of chapters and sub-chapters and names of chapters and sub-chapters, and populating cells of the empty grid with program element file names. A program element is associated with each program element file name in each sub-chapter. The grid matrix formatted so that each row is a sub-chapter with selectable program elements common to all columns and each column is a chapter having sub-chapters that are related thereto. One or more identification images and one or more sponsorship ID images are input, each or which are associated at least with the respective chapters. An offering toolbar is displayed on a portion of the video display, the offering toolbar including the program name, chapter name, identification and sponsorship ID images for the chapters.

Another example embodiment is directed to a system for providing enhanced media content narrative of a program to be played back. The system includes an offering toolbar for selecting program content from a program. The toolbar is formatted in a row by column matrix of program elements, each row being a sub-chapter of selectable program elements common to all columns and each column being a chapter with sub-chapters that are related thereto. The toolbar includes, for each chapter, the chapter name, identification image of the chapter, and sponsorship ID image of the chapter.

BRIEF DESCRIPTION OF THE DRAWINGS

The example embodiments will become more fully understood from the detailed description given herein below and the accompanying drawings which are given by way of illustration only, wherein like reference numerals designate corresponding parts in the various drawings.

FIGS. 2A-2C are partial example grid representations to illustrate building the basic navigation grid matrix.

FIG. 3 is an example partial grid representation describing the inputting of file locations into the interactive grid matrix.

FIG. 4 is an example partial grid representation describing the inputting of file descriptions into the grid matrix.

FIG. 6 is an example partial grid representation representing the inputting of identification images into the grid matrix.

FIG. 8 is an example partial grid representation with image representing an automated offering toolbar for the user.

FIG. 9 is an example partial grid representation with image representing an automated element transition and load screen.

DETAILED DESCRIPTION

Figure 1A:
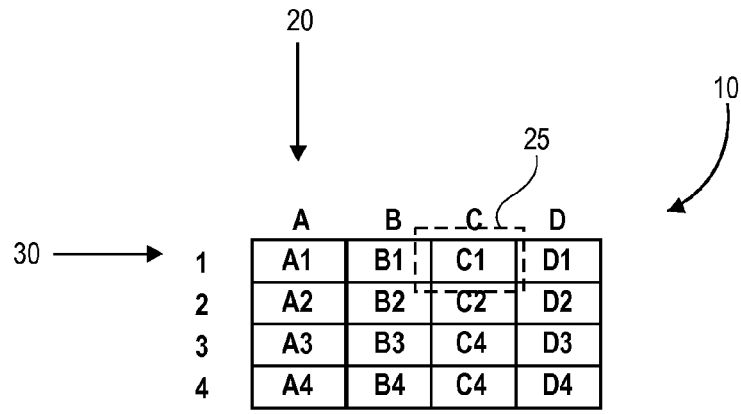
FIGS. 1A and 1B provide an overview of the chapter/sub-chapter arrangement of the interactive navigation grid matrix.

As used herein, the word 'method' may represent a process by which mass amounts of media content/data are organized in order to create an enhanced media program that can provide an 'end user' or 'viewer' the capability to manipulate the formatted content/data. The phrase 'end user or viewer' as used herein may include designers, directors, producers, publishers, editors, professionals or casual users of the formatted media content/data. The phrase "user/designer" is employed to denote industry personnel that would typically implement the methodology to create and populate the novel media content narrative grid matrix described herein, for purposes of offering such a product to the aforementioned end-user or viewer.

The example method(s) as to be described below in more detail may be implemented in both hardware and software configurations. Accordingly, the example methods provide for the creation of a video program in a manner that facilitates the end user's ability for direct control over how the media content will be presented, as well as to simplify content preparation for playback.

Forms of media content, either pre-existing or to be developed in the future, can be exploited using the example system to be described in detail hereafter. Forms of media content may include, but are not limited to, video, still picture, audio and written works. Selections for how the content can be manipulated by the end user may be based in part on the kind or configuration of media content being accessed. Example configuration arrangement types include but are not limited to linear, non-linear, formatted, reformatted, still picture, HD, 480i, 1080i, 1080p, written, text, narration, etc.

Applications or devices that may employ and/or be configured to implement the example methodology, or which may constitute one or more components of the example system include but are not limited to: DVDs, CDs, printed books, e-books, audio recordings, video recordings, photo galleries, PowerPoint presentations, high density (HD) technologies and/or storage media, Blue Ray laser technologies or storage media, hard drives, offsite servers, flash memory cards, and/or other equivalent and future media storage types/devices, for example. Output of this data may be protected (encrypted, keyed, password locked, etc.) or provided without encryption/protection. The example methods are applicable to systems employing encryption/protection or no encryption/protection.

The example methods may facilitate a recording of end user choices to gather demographic data for broadcasters, advertisers and other groups or entities which may be interested in the data. In accordance with the example embodiments, no sensitive personal identity information need be collected.

The example method for assembling an enhanced media content narrative can be understood as a semi-automated process by which an enhanced media program is created. The application complements the inventor's processes described in his '721 application entitled "Methods of Enhancing Media Narrative" and is designed to simplify content preparation for playback.

In general, the method includes several process steps designed to organize media files and identification notations of an enhanced media program into the aforementioned navigation grid matrix with sponsorship placement. The example methodology may be designed to function in conjunction with digital asset management (DAM) tools used for data tagging and content management on a media server. Digital assets may include photographic images, video files, audio files, text files, and/or data context information, for example.

Figure 1B:
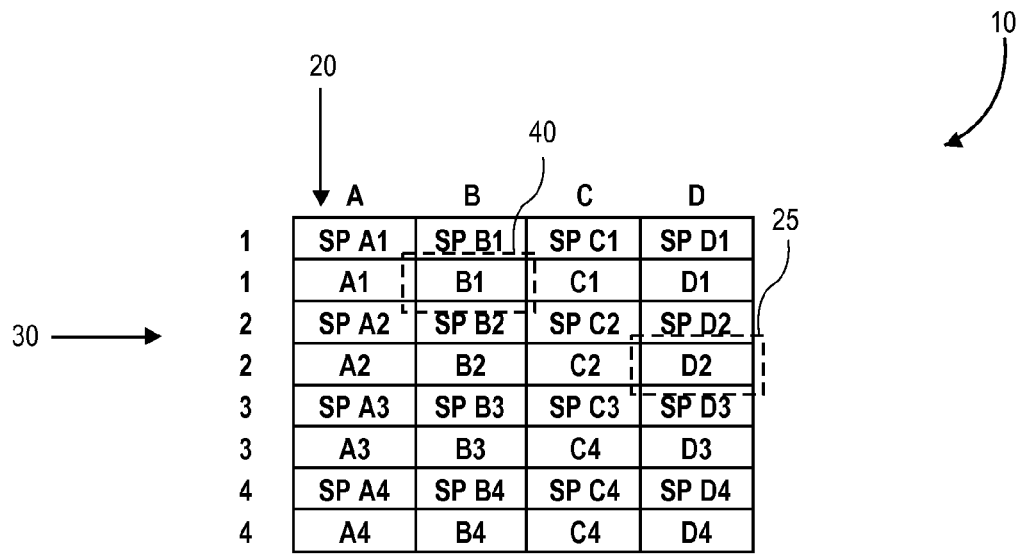

FIGS. 1A and 1B provide an overview of the chapter/sub-chapter arrangement of an interactive navigation grid matrix 10. As can be seen FIG. 1A, columns A through D denote chapters 20, and rows 1 through 4 denote sub-chapters 30. The example navigation grid matrix 10 has a formatted organization between chapters 20 and sub-chapters 30 such that the sub-chapters 30 are related to or tied to the chapters 20. The intersection of a row and column forms a cell, which may be understood as a program element 25, or a program element with sponsorship ID 40, as shown in the grid matrix of FIG. 1B. The example methodology illustrates how this grid matrix 10 is constructed for integration onto a display bar (with drop down for selectable chapters and/or program elements), and how it is ultimately loaded for the proper screen display upon selection. Although only a 4×4 matrix display is shown, it is obvious that a grid matrix display of any number of chapters and sub-chapters could be constructed in accordance with the example embodiments.

The example methodology shall be described in building an interactive navigation grid matrix to be displayed on a video program, the 2008 U.S. Open golf championship. Data will be built into the grid for the live program as viewed, selected scenes for golfers Tiger Woods, Phil Michelson and Vijay Singh. This application is merely exemplary; the example embodiments could be applied to any program and/or for any content.

Initially, building the grid matrix requires the inputting of program element data. For example, the inputting step can be exemplified by a number of functional steps. Initially, the program name, number of chapters and sub-chapters for the grid may be defined by simple queries. As indicated by the example below, the program name is the "2008 U.S. Open", with four (4) chapters and four (4) sub-chapters selected.

Example

| COMMAND | RESPONSE |
|---|---|
| Step 1: Input program name | |
| "Insert program name" | 2008 U.S. Open |
| Step 2: Input number of Chapter and sub-chapter elements | |
| "Insert # of Chapters/Channels" | 4 |
| "Insert # of sub-chapters" | 4 |

FIGS. 2A-2C are partial example grid representations to illustrate building the basic navigation grid matrix. In these and subsequent figures user responses or entries are shown in italics for purposes of clarity. As described in FIGS. 2A-2C, names for the content to be loaded into the interactive navigation matrix are to be populated. In FIG. 2A, the user is queried to insert chapter names. In this example, four (4) chapters have been added: (1) live program; (2) Tiger Woods; (3) Phil Mickelson; and (4) Vijay Singh.

Sub-chapter names are then assigned. In FIG. 2B, the user is queried to insert these sub-chapter names. In this example, the sub-chapter names are the first four (4) holes of the U.S. Open. In FIG. 2C, the result of these entry functions is an empty grid matrix 10 (here shown as an empty 4×4 matrix) with the inserted chapters 20 and related sub-chapters 30. In other words, the chapter and sub-chapter names simply form the headers of empty cells in the row by column navigation grid matrix Once the grid configuration and program file name data has been input to create the empty grid matrix, associations between the content and names for the program files are needed. FIGS. 3-11 illustrate functions performed in order to build the displayed grid matrix for navigation by the user.

Some of the functions are performed in conjunction with digital asset management software such as that provided by Vfinity™ for example.

FIG. 3 is an example partial grid representation describing the inputting of file locations into the interactive grid matrix. As shown in FIG. 3, the user/designer is queried to insert the corresponding media element file name(s). Each file name, such as "Tiger Woods hole 1" is a file location on a given media storage server, and is the content ID that represents a program element in a given cell of the grid. Accordingly, the program element 25 associated with the sub-chapter 30 or row being filled (i.e. hole 1 in this example) is inserted for each of the four chapters 20 (Live program, Tiger Woods, Phil Mickelson, Vijay Singh).

FIG. 4 is an example partial grid representation describing the inputting of file descriptions into the grid matrix 10. Once the cells in the grid matrix 10 have been populated with the file names or "content IDs" representing the program elements 25, the user/designer is queried to enter the element file description tag for each program element 25. As shown in FIG. 4, the user has selected "Tiger Woods hole 1" and added the description "2008 U.S. Open Tiger Woods hole 1. Tiger shoots a birdie."

Figure 5:
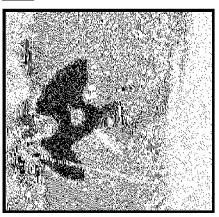
FIG. 5 is an illustration of an edit metadata page of a digital management asset software tool.

In selecting the file name, the user/designer may be directed to the digital asset management DMA software. As shown in FIG. 5, there is shown an "edit metadata" page of the DMA software tool. The edit metadata page enables the user to change or edit one or more of the tags that represent the element file description tag. As shown in FIG. 5, the element file description tag has been broken down into three titles: "2008 U.S. Open", "Tiger Woods hole 1.", and "Tiger shoots a birdie."

FIG. 6 is an example partial grid representation representing the inputting of identification images into the grid matrix 10. As shown in FIG. 6, the user/designer has selected "Tiger Woods hole 1" and, upon being queried to select an identification image, uploads an image of Tiger Woods staring down a put on the first hole. This becomes the image identifier for the program element 25 representing Tiger Woods hole 1. This function is to be performed for each program element 25.

The program element identification image can be unique to each program element, or can be used for each program element in a given chapter (i.e., for each of holes 1-4 in the Tiger Woods chapter in this example. The selected image is to be displayed on the offering bar that is displayed at the bottom of the program being viewed by the user/designer, i.e., the 2008 U.S. Open in this example.

Figure 7:
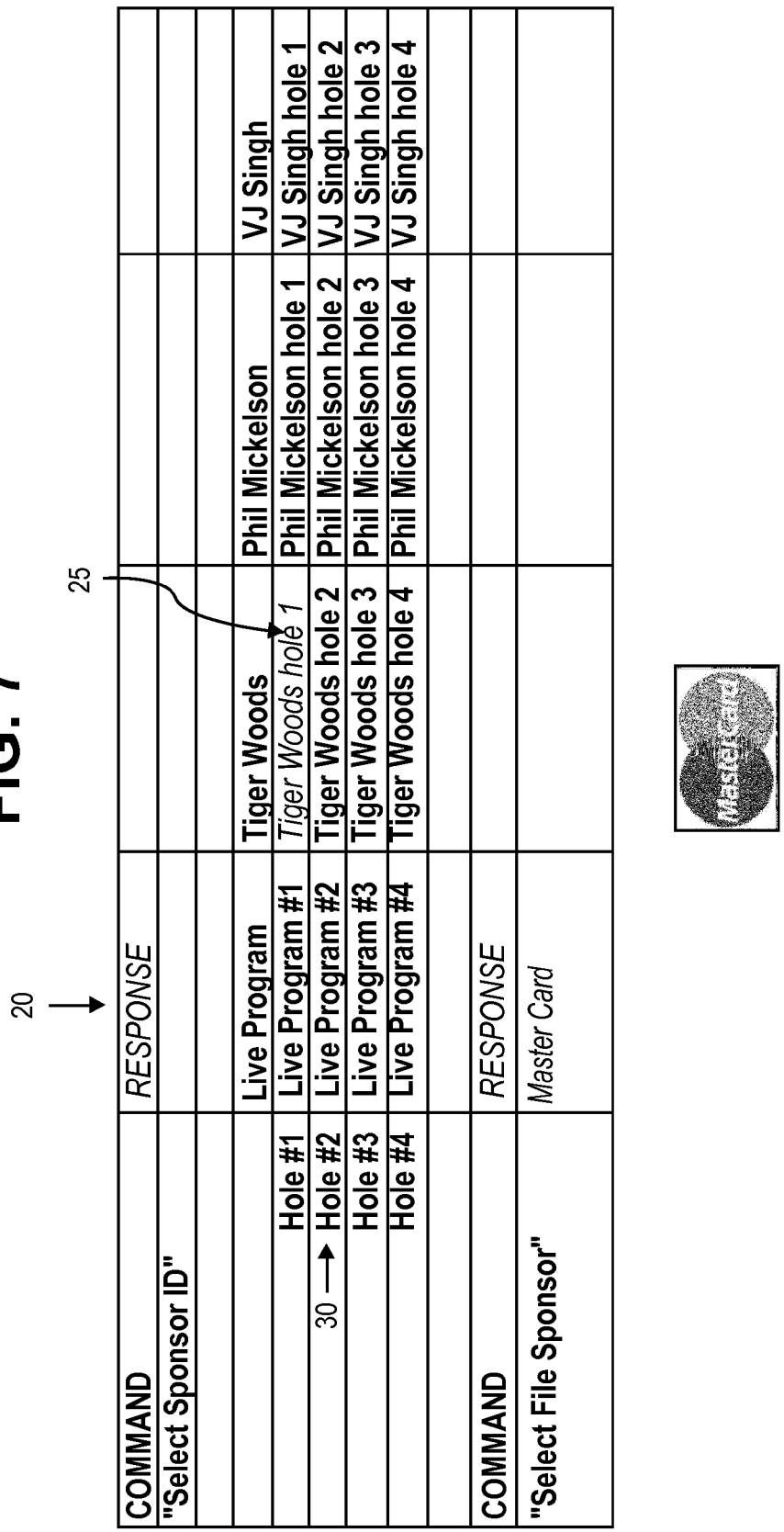
FIG. 7 is an example partial grid representation representing the inputting of an element sponsorship ID into the grid matrix.
Figure 10:
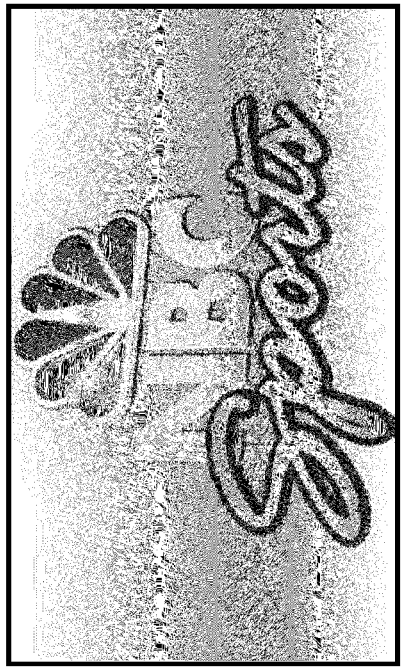
FIG. 10 is an icon to represent the loading of a program introduction.

FIG. 7 is an example partial grid representation representing the inputting of an element sponsorship ID into the grid matrix. As shown in FIG. 7, the user/designer has selected "Tiger Woods hole 1" for a sponsor's ID. Upon being queried to select a file sponsor, the user/designer uploads a MasterCard® logo. This logo becomes the sponsor ID associated with the program element representing Tiger Woods hole 1. This function may be performed for each program element 25 in each of the different chapters 20. The sponsorship ID may be different as between chapters 20, sub-chapters 30 and/or individual program elements 25.

FIG. 8 is an example partial grid representation with image representing an automated offering toolbar for the end-user or viewer. Once the grid matrix has been defined by its configuration, names for the chapters, subchapters and program elements, and associations between content/sponsorship and program elements, a grid matrix "toolbar" may be displayed for the user. In an example, this may be displayed automatically during the video program being viewed upon playback or displayed upon a command by the end-user or viewer.

As shown in FIG. 8, upon a query "Display toolbar" the user selects the sub-chapter of Hole #1 for each of the four chapters. The automated offering bar identification screen below the grid is what the user would see on his or her display. As can be seen, four program element identification images, each with its associated sponsorship ID, is displayed for the first hole at the 2008 U.S. Open. By selecting any one of the program elements, the end-user or viewer can view the stored content corresponding to the selection. Accordingly, the automated offering bar identification screen combines the chapter ID, program element file name, element identification image and sponsorship ID.

FIG. 9 is an example partial grid representation with image representing an automated element transition and load screen. Upon a query "select element load screen", the user/designer selects Tiger Woods LS1. The automated load screen combines the program name, chapter name, element identification image and sponsorship ID. The automated element transition and load screen is designed to flash up on the program being viewed about 2-3 seconds before the selected content begins playing. This lets the end-user or viewer confirm their selection, and indicates the start of the selected content. In an example, it is desirable that the interactive enhanced media content be prepared as close to the completion of the live event as possible, such as within 6 hours of the ending of the event.

Upon completion of the display functions for the toolbar and load screens, the user/designer may be queried to insert a program introduction. In the present example, the user loads in a video introduction for "NBC Sports 2008 U.S. Open", or the original broadcaster of the program. This is shown generally by the icon in FIG. 10.

Figure 11:
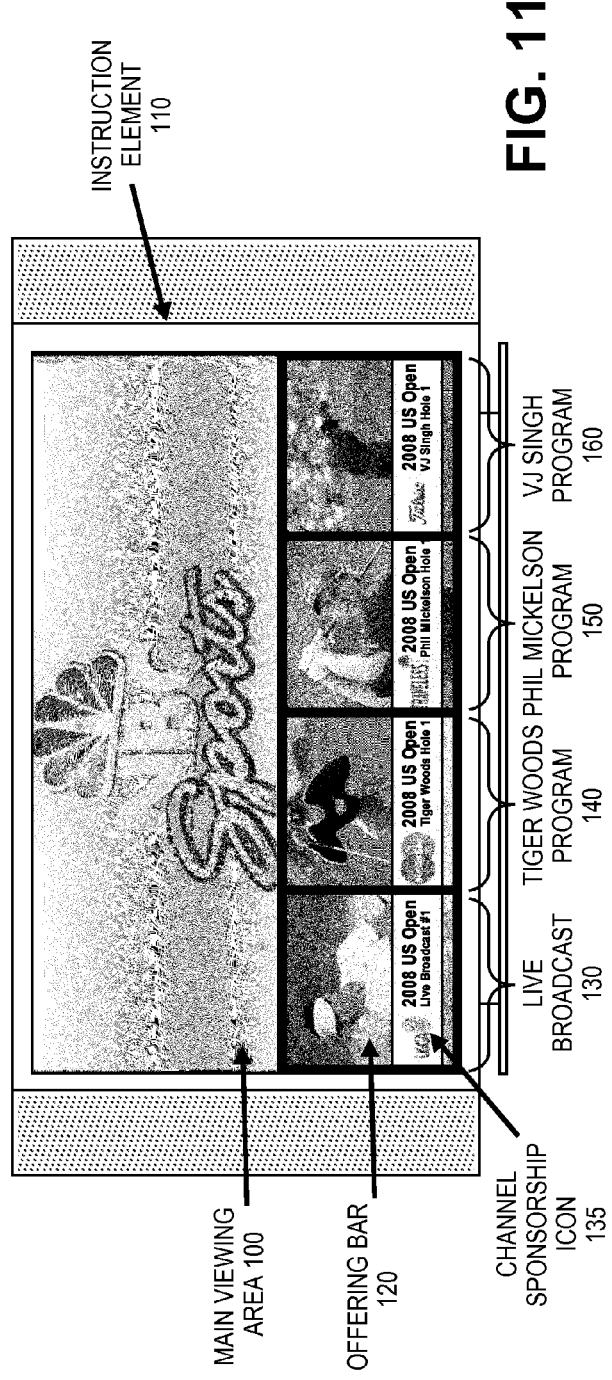
FIG. 11 is a main menu of the interactive grid matrix as displayed to the user.

FIG. 11 is a main menu of the resultant interactive grid matrix as to be displayed to the viewer. The final function is to create the overall interactive grid matrix display to be seen and manipulated by the end-user or viewer. This function combines the offering bar of FIG. 8 and the video introduction of FIG. 10. The display screen includes a main viewing area 100, an introduction element 110, and the offering bar 120. The offering bar 120 includes each of the four chapters (Live Broadcast 130, Tiger Woods program 140, Phil Mickelson program 150 and Vijay Singh program 160). The program name (2008 U.S. Open) is listed on each of the four chapters. Each of the four chapters has its associated sponsorship ID (see USGA sponsorship ID 135 for the live broadcast chapter/channel). Accordingly as shown in FIG. 11, the grid matrix 10 may be formatted so as to be displayed as a single row across a portion of a video screen while the program is being played back. This offering bar 120 is thus available to the end-user or viewer for enhancing the end-user or viewer's narrative playback, as described in greater detail in the co-pending '721 application.

For example, the end-user is provided with a plurality of selectable alternative video program scenes (each of the 4 holes of the four chapters) for a program being viewed (2008 U.S. Open), on a portion of the display (viewing area 100) as a plurality of selectable elements in a multiple column by multiple row navigation grid, the grid matrix 10 formatted so that each row (hole) represents a sub-chapter 30 of selectable elements (holes 1-4 for the live coverage, Tiger Woods, Phil Michelson and Vijay Singh) that are common to all columns and each column represents a chapter having designated sub-chapters (or each golfer and the live feed) therein that are tied to the respective chapter 20.

The end-user or viewer can be prompted with the offering bar 120 to select one or more of the elements in the navigation grid and upon selection, as shown in FIG. 9, can play the video scenes according to the selection, such as "Tiger Woods Hole 1" for example.

The example embodiments being thus described, it will be obvious that the same may be varied in many ways. Such variations are not to be regarded as departure from the example embodiments, and all such modifications as would be obvious to one skilled in the art are intended to be included herein.

What is claimed:

1. A method of assembling an enhanced media content narrative of a video program with selectable video clips accessible by a viewer thereof, the narrative built by the viewer as an interactive navigation grid matrix to be displayed via an interface and display to the viewer, comprising:
    providing a fillable cell via the interface so as to enable the viewer to insert a title of the video program,
    providing a plurality of fillable cells via the interface so as to enable the viewer to insert chapter and sub-chapter names for media content of the video program and a corresponding number of chapters and a number of sub-chapters,
    the chapter and sub-chapter names forming headers of empty cells for a multiple row by multiple column, interactive navigation grid matrix displayed to the viewer,
    the viewer populating, via the interface, the empty cells of the interactive navigation grid matrix with video clip file names, and
    associating a selectable video clip in each sub-chapter with each selectable video clip file name, each video clip selectable by the viewer for display thereto via the interface and representing a selectable alternative video program scene of the video program, the interactive navigation grid matrix formatted so that each row displayed to the viewer is a sub-chapter with selectable video clips common to all columns and each column displayed to the viewer is a chapter having sub-chapters that are related thereto.

2. The method of claim 1, wherein associating a selectable video clip in each sub-chapter further includes:
    inputting a media element file name corresponding to its cell location, and
    inputting the element file description tag for the program element.

3. The method of claim 1, further comprising:
    inputting one or more identification images, each identification image associated with a specific chapter or for a selectable video clip that is related to its corresponding chapter.

4. The method of claim 1, further comprising:
    inputting one or more sponsorship identification images, each sponsorship identification image associated with a specific chapter or sub-chapter, or different as between chapters, sub-chapters and selectable video clips.

5. The method of claim 1, further comprising:
    displaying the grid matrix in the form of an offering toolbar across a portion of a video screen while the program is being played back, the toolbar permitting selection of a selectable video clip by an end-user.

6. The method of claim 5, further comprising:
    inputting one or more identification images and sponsorship identification images, each of which are associated at least with a corresponding chapter,
    wherein the toolbar includes the title, chapter name, and the identification image and sponsorship image for each chapter thereon.

7. The method of claim 5, further comprising:
    displaying a video introduction on a main viewing area of the video display screen above the offering toolbar.

8. The method of claim 5, wherein upon selection of a selectable video clip for playback, a delay is set to allow the end-user to confirm their selection before the selected content is played back.

9. The method of claim 8, wherein the delay is approximately 2-3 seconds.

10. A method of assembling an enhanced media content narrative of a video program with selectable video clips for a viewer thereof, the narrative built by the viewer as an interactive navigation grid matrix to be displayed via an interface and display to the viewer, the video program to be played back on a video display, the method comprising:
    configuring an empty multiple row by multiple column grid matrix to be populated with selectable video clips of the video program by inputting the title, numbers of chapters and sub-chapters and names of chapters and sub-chapters,
    populating cells of the empty grid matrix with selectable video clip file names,
    associating a selectable video clip with each file name in each sub-chapter, the grid matrix formatted so that each row is a sub-chapter with selectable video clips common to all columns and each column is a chapter having sub-chapters that are related thereto,
    inputting one or more identification images and one or more sponsorship identification images, each of which is associated at least with the respective chapters, and
    displaying an offering toolbar on a portion of the video display, the offering toolbar including the title, chapter name, identification and sponsorship identification images for the chapters.

11. The method of claim 10, wherein each identification image input is either associated with a specific chapter or is for a selectable video clip that is related to its corresponding chapter.

12. The method of claim 10, wherein each sponsorship identification image input is either associated with a specific chapter or sub-chapter, or is different as between chapters, sub-chapters and selectable video clips.

13. The method of claim 10, further comprising:
    displaying a video introduction on a main viewing area of the video display screen above the offering toolbar.

14. The method of claim 10, wherein upon selection of a selectable video clip for playback, a delay is set to allow the end-user to confirm their selection before the selected content is played back.

15. The method of claim 14, wherein the delay is approximately 2-3 seconds.

* * * * *